(No Model.)
S. PORTER.
SPRING FASTENER.
No. 564,761.  Patented July 28, 1896.
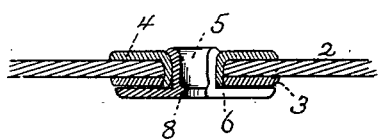
Fig-1-
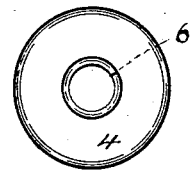
Fig-2-
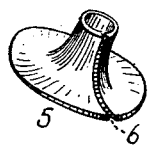
Fig-4-
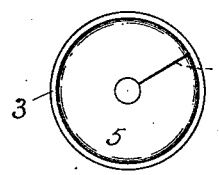
Fig-3-
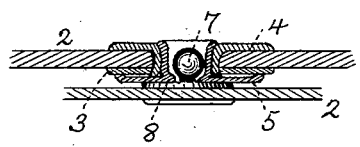
Fig-5-
WITNESSES —
Chas. M. Adams
Geo. F. Wood
INVENTOR —
Stephen Porter.
by H. E. Lodge Atty.

UNITED STATES PATENT OFFICE.

STEPHEN PORTER, OF BOSTON, MASSACHUSETTS, ASSIGNOR TO MILTON A. KENT, OF SAME PLACE.

SPRING-FASTENER.

SPECIFICATION forming part of Letters Patent No. 564,761, dated July 28, 1896.

Application filed June 10, 1895. Serial No. 552,234. (No model.)

*To all whom it may concern:*

Be it known that I, STEPHEN PORTER, a citizen of the United States, residing at Boston, in the county of Suffolk and State of Massachusetts, have invented certain new and useful Improvements in Spring-Fasteners; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to fasteners for gloves or analogous articles, particularly that class termed "spring-fasteners." This class of fasteners is composed in general of two members—a stud and a socket—which are adapted to interlock and thus secure together the meeting portions of the glove or other article.

My invention in the present instance relates to the socket member of the fastener; and it consists in improvements whereby I produce a spring member at the smallest possible cost and with the minimum number of parts.

The gist of my invention is embodied in a split eyelet, that is, one which contains a radial cut, while the shank portion is to enter either a plain washer or engage with a second integral eyelet. Hence by means of the split a spring action is obtained or a circumferential expansive movement, and thus the eyelet is adapted to receive the head of the shank on the stud member, while at the same time the split eyelet is encircled or grasped about the shank by the washer or the intact eyelet, and prevents undue expansion of the spring member or split eyelet should a large stud be thrust into the socket member or should an undue strain be exerted. On the other hand, the unconfined split flange is free to open or close, due to the inherent elasticity of the metal composing it.

The drawings represent in Figure 1 a central cross-section of a socket member of a spring-fastener embodying my invention. Fig. 2 is a top view of the same. Fig. 3 is a reverse plan of the socket member. Fig. 4 is a perspective view of the split eyelet. Fig. 5 is a diametrical vertical section of the spring-fastener as an entirety.

In the accompanying drawings, 2 represents the material to which is secured a button member of a spring-fastener comprising three parts—a simple washer 3, a flanged eyelet 4, and a split eyelet 5. In order to secure the parts to a fabric, a glove, or other article, a hole is punched in the material, the washer is laid upon the under side and the integral eyelet upon the outside of said fabric, when the two are interlocked; but this device as it now is contains no spring element. Hence I employ an ordinary flanged eyelet 5 and create a radial slit 6, as in Fig. 4. This element is now positioned on the under side of the fabric and its shank pushed through the shank of the first eyelet. In this position the shank of the split eyelet is spread or upset at the end and thereby secured to the flange of the integral eyelet, with the flange of the split eyelet resting against the washer. It is to be understood that the diameter of the shank of the split eyelet is just enough smaller than the bore of the integral eyelet as to allow of slight come-and-go movement to the adjacent edges of the split portions.

In the insertion of the stud member 7, as shown, the neck of the latter is intended to be opposite the flange of the split eyelet or thereabout, and as the head passes through said flange and up into the shank the unconfined split flange is free to expand and then contracts after the stud has entered the socket member, as shown in Fig. 5, when they are in engagement. Hence the stud is firmly held and grasped by the socket member.

One of the great advantages of this form of spring-fastener, as relates to the socket member embodying my invention, consists in the fact that only simple, well-known, and easily-manufactured elements are employed, and the number may be reduced to the fewest possible—an integral washer 3, a split eyelet 5, and an integral eyelet 4—as shown in Fig. 1. These three elements in practice I find are the most preferred construction, since the integral eyelet and washer, now fast to the material, serve as means by which to secure the split washer in place, and a better effect is produced, since the split eyelet is now free to perform the sole function of a spring in order to engage with and clasp the stud.

To render the engagement of the split eyelet more positive, I form or roll in on the split eyelet at the union of the flange with the shank a slight prominence or annular lip 8, and thus add to the clasping action of said eyelet, rendering accidental disengagement more difficult.

What I claim is—

1. In combination an expansible eyelet, having a longitudinal split to allow the contiguous portions to come and go, an integral eyelet which incloses the shank of the split eyelet to prevent undue expansion, and a washer to engage the integral eyelet, said group of parts to constitute a socket member of a spring-fastener, substantially as specified.

2. In a fastener comprising a socket member and a stud member, a socket member consisting of a flanged expansible eyelet having a longitudinal through-and-through opening on one side, a flanged integral eyelet, and a washer, the integral eyelet and washer interlocked to hold the socket member to the fabric, and the split-eyelet shank affixed within the integral eyelet and operating to clasp the stud member, substantially as described.

In testimony whereof I affix my signature in presence of two witnesses.

STEPHEN PORTER.

Witnesses:
H. E. LODGE,
FRANCIS C. STANWOOD.